O. F. WALLMAN.
LITTER CARRIER.
APPLICATION FILED AUG. 30, 1918.
1,312,066.
Patented Aug. 5, 1919.
2 SHEETS—SHEET 2.
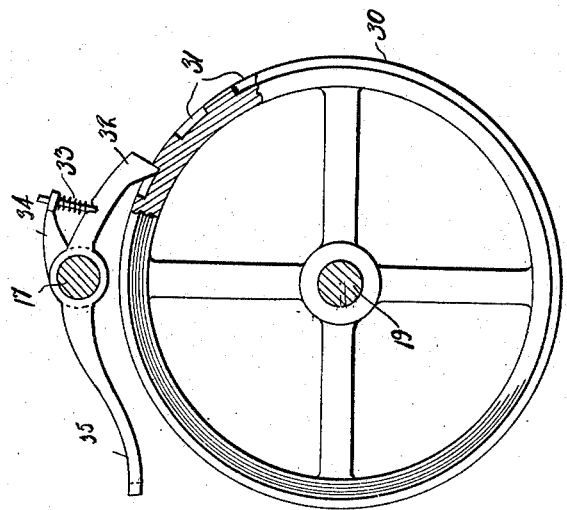
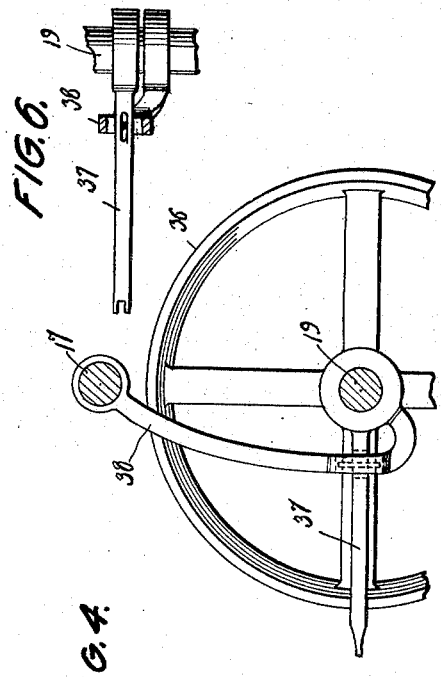
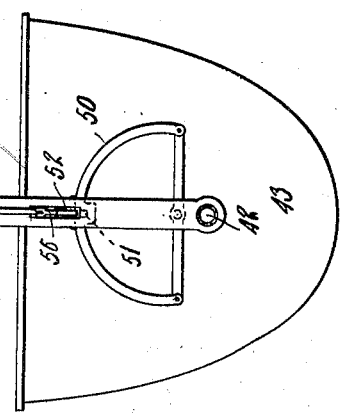
Witnesses
W. C. Fielding
Dwight S. Gale
Inventor
Otto F. Wallman
By Richard B. Owen
Attorney

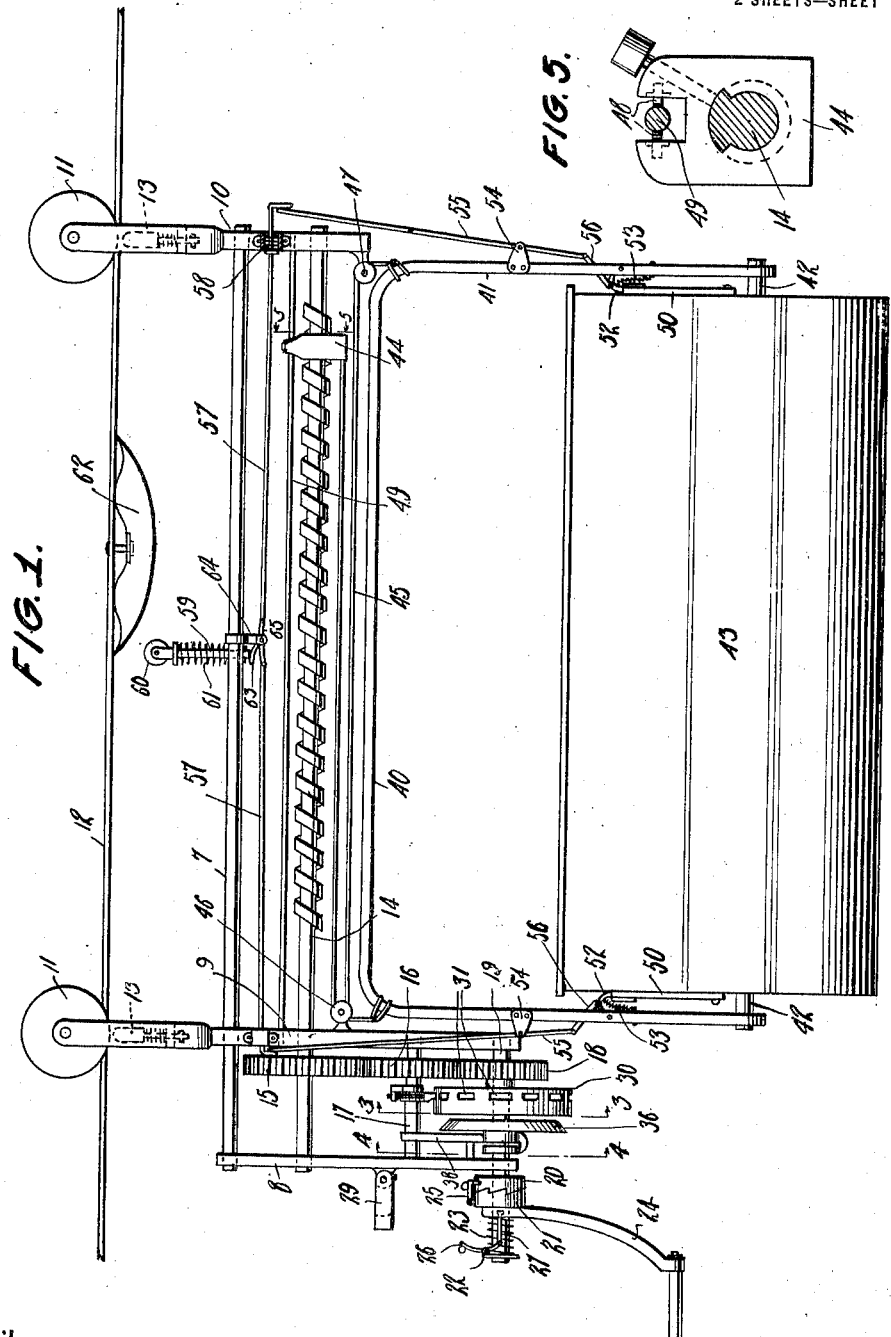

UNITED STATES PATENT OFFICE.

OTTO F. WALLMAN, OF STRATFORD, WISCONSIN.

LITTER-CARRIER.

1,312,066. Specification of Letters Patent. Patented Aug. 5, 1919.

Application filed August 30, 1918. Serial No. 252,080.

*To all whom it may concern:*

Be it known that I, OTTO F. WALLMAN, a citizen of the United States, residing at Stratford, in the county of Marathon and State of Wisconsin, have invented certain new and useful Improvements in Litter-Carriers, of which the following is a specification.

This invention relates generally to litter carriers, and has for its primary object to generally simplify and improve the construction and operation of devices of this character, as well as to increase their efficiency.

A further object of the invention is to provide a litter carrier which is of such construction that the carrier itself need not be touched after once being filled, as it may be elevated, moved and dumped without the operator coming in contact with the same.

A further object of the invention is to provide improved bucket construction in connection with a litter carrier, which is self-righting in operation after the litter has been dumped.

Still further objects reside in providing a device of the character stated which is of extremely simple construction, and easy of operation, which involves the use of automatic and semi-automatic mechanism for performing various functions, which has its various parts so contructed, arranged and assembled as to minimize the opportunity for wear or breakage, and which will prove thoroughly practical in use.

In the drawings:—

Figure 1 is a side elevation of a litter carrier constructed in accordance with the invention, Fig. 2 is an end view of the improved litter carrier, Fig. 3 is an enlarged detail fragmentary view of a part of the operating mechanism, taken on the line 3—3 of Fig. 1;

Fig. 4 is a similar view of the clutch actuating device, taken on the line 4—4 of Fig. 1.

Fig. 5 is a detail fragmentary view on the line 5—5 of Fig. 1, and

Fig. 6 is a detail sectional view illustrating the manner in which the clutch actuating lever is mounted.

Referring now more particularly to the drawing, the litter carrying frame, includes a bar or rod 7, having a pair of spaced depending arms 8 and 9 respectively near one end, and a depending arm 10 at the opposite end. The arms 9 and 10 extend above the bar 7 as shown, and are yoked and rotatably support the groove wheels 11. These wheels rest upon the track or wire 12 so that the carrier may be readily moved from place to place. The wheels are prevented from becoming disengaged from the track or wire 12 by the spring pressed elements 13, the latter being positioned beneath the track and are normally held in close proximity thereto.

The depending arms 8—9—10 rotatably support a worm screw 14, the latter being arranged in spaced parallel relation to the bar 7 and one end of this screw has secured thereto, a gear 15. The gear 15 is in mesh with an intermediate gear 16 rotatably mounted upon a shaft 17 fixed to the arms 8—9 and beneath the adjacent end of the worm screw 14. The intermediate gear 16 is in mesh with a gear 18 fixedly secured to a shaft 19 rotatably mounted at the lower end of the frame and in the depending arms 8 and 9. The shaft 19 near its outer end is provided with a clutch head 20, the latter being fixedly secured to the said shaft, and a rotatable and longitudinally movable clutch head 21 is arranged near the extremity of the said shaft and is adapted to engage with the head 20. A collar 22 is rotatably mounted at the extremity of the shaft and supports one end of an expansion spring 23, the latter surrounding the said shaft and bearing at its inner end against the movable clutch head 21. A handle or crank 24 is affixed to the movable clutch head whereby the latter may be readily rotated by the operator of the device. From this construction, it is obvious that rotation of the crank 24 in one direction will cause the worm gear 14 through the instrumentality of gears 15—16—18, to rotate in a direction similar to the direction of rotation of the shaft 19. Should it be desired to reverse the direction of rotation of the shaft 19, the latch member 25 carried by the movable head 21 will be moved over and locked with the fixed head 20, thus establishing a positive connection between the clutch heads. The movable clutch head 21 may be caused to become disengaged from the head 20 by rocking the lever 26 forwardly. This lever is pivoted intermediate its ends upon the collar 22, and at its lower end is pivotally connected with the link 27, the latter at its inner end being connected with the handle 24 affixed to the clutch head 21. The arm 8 is provided with a bracket member 29, the end of which may be slotted or recessed to receive the crank 24. This particular arrangement enables the crank to be held firmly in upright position when required. The bracket member 29 is pivoted as shown, so as to be able to be swung downwardly and inwardly out of the path of travel of the crank 24 when the latter is being moved.

The shaft 19 has affixed thereto a drum 30 having openings 31 in the periphery thereof. These openings are engaged by a pawl 32 rockably mounted upon the fixed shaft 17, and the pawl is normally held yieldably engaged with the drum periphery by means of the spring 33 supported by arm 34 affixed to the said shaft 17. The pawl may be controlled manually by operating the rear end 35 thereof. The outer face of the drum 30 is designed to be engaged by the friction disk 36. This disk is rotatably mounted upon the shaft 19, and is designed to be moved into or out of engagement with the drum by actuation of the arm 37. The arm 37 extends through a supporting post 38 affixed in the frame and preferably to shafts 17 and 19. By grasping the arm 37 and rocking the same upon its pivot, it is obvious that the friction disk 36 will be moved into or out of engagement with the drum 30 depending upon the direction of movement of the arm 37.

The carrier *per se* includes a bail 40 having depending arms 41. This bail is arranged beneath the frame and is supported thereby, and the lower ends of the arms 41 rotatably support the ends of pintles 42 affixed to the ends of the conveyer bucket 43. It will be observed particularly with reference to Fig. 2 of the drawings, that the point of connection of the pintles with the bucket ends, is below the vertical center of the bucket.

The worm screw 14 is threaded through a block or traveler 44 to which the ends of cables or cords 45 are secured. These cords pass over the double pulley 46 secured to the depending arm 9 directly beneath the worm screw 14, and one of these cords is connected to the adjacent end of the bail 40. The other cord extends around the pulley and is disposed beneath the worm screw 14 and passes over a pulley 47 at the lower end of arm 10. The cord then passes downwardly and is connected to the adjacent end of the bail. The other portion of the traveler or block 44 is provided with a pair of spaced horizontally disposed rollers 48 which engage between them the guide rod 49 connecting arms 9 and 10. From this construction it is obvious that rotary movement applied to the worm screw 14 will cause the traveler or block 44 to move longitudinally of the worm screw, and this block will be held steady during movement by engagement of the rollers 48 with the guide rod 49. As the block moves, the cords 45 are tightened or relaxed, depending upon the direction of movement of the block. If the cords are being tightened, the bail and carrier will be lifted, whereas if the block is traveling toward the crank end of the frame, the bail will be lowered. When the carrier is being lowered, the operator depresses arm 35, moving pawl 32 out of engagement with the notches or openings in the periphery of drum 30, and to prevent too rapid movement of the carrier downwardly, the brake or friction disk 36 is actuated. The actuation of this disk, it will be remembered, is controlled by operating the arm 37. When the device is being lowered, the clutch head 31 may be out of engagement with the fixed head 20, and the crank 24 will be held securely in upright position by the element 29. In raising the carrier, the clutch head 21 is engaged with the head 20, and rotary movement is applied to the crank 24. This rotary movement causes the gearing 19—16—15 to rotate the worm screw 14 in such direction that the block 44 will be moved away from the crank end of the frame. This movement of the block causes the ropes to be tightened, whereby upward movement is applied to the bail.

Associated with the above described device is a mechanism for causing the bucket 43 to automatically dump when the carrier reaches a predetermined place.

Each end of the bucket 43 has arranged thereon an arcuate member 50, the said members being eccentric to the pintles 42. The medial portion of each arcuate member is provided with a notch or a recess 51 to receive a pawl or detent 52 pivoted upon the adjacent arm 41 of the bail. The detents are yieldably held engaged within the notches by contractile springs 53, the latter being secured at one end to the bail arms and at the opposite ends to the pawls. Each bail arm carries a bracket 54 intermediate its ends. These brackets have pivotally mounted therein the levers 55, the lower ends of which are connected to the pawls 52 by means of links 56. The upper ends of these levers are engaged beneath the downturned ends of trip actuating rods 57 slidably mounted in the carrier frame. These rods are held normally extended by expansion springs 58 arranged within suitable brackets upon the frame through which the said rods protrude.

The trip mechanism for the bucket includes a vertically disposed plunger 59 carried by the bar or beam 7 of the frame, and this plunger is provided at its upper extremity with a friction roller 60. A spring 61 holds the plunger at the limit of its upward travel and in the path of the detent or abutment 62 carried by the wire or track 12. The lower end of this plunger rests upon a lever 63 pivotally mounted in a bracket 64 upon the bar 7, and the lever has connected thereto, the oppositely disposed arms 65, to which the inner ends of the rods 57 are pivotally connected. The construction is such that when the plunger 59 is depressed against the tension of spring 61, the lever 63 will be rocked downwardly, whereupon the free ends of the arms 65 will act upon the rods 57 to draw the latter toward each other. This movement of the rods causes the upper ends of the levers 55 to be moved inwardly, whereupon outward pull is applied to the links 56 at the lower ends of the said levers. This action of the links causes the pawls 52 to be moved from engagement within the notches 51 in the arcuate members 50 on the extremities of the bucket. By reason of the fact that the bucket is eccentrically mounted in the lower end of the bail arm, the said bucket will readily move to inverted position, whereby the contents of the latter will be deposited. The violent rocking movement of the bucket incident to the dumping operation causes the said bucket to swing upwardly after the same has emptied, and the latch members or pawls 52 will at once engage in the depressions or notches 51 in the bucket ends.

From the foregoing, it is obvious that I have provided a litter carrier of extremely simple construction and which may be readily operated without difficulty. The various parts are constructed and assembled in such manner as to provide a device highly efficient for its purposes, and the various parts cannot become easily broken or deranged.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having thus fully described the invention, what I claim as new and desire to secure by Letters Patent is:—

1. In a device of the character described, the combination of a bail, means for movably supporting said bail, a bucket eccentrically mounted upon said bail and having recessed members at its ends, detents carried by said bail and normally fitting within said recesses for normally holding said bucket in an upright position, links connected to said detents, levers pivotally mounted upon said bail and being connected to said links, rods carried by said supporting means and having bent ends engaging said levers, an arm connected to the inner end of said rods, and having a lever extending therefrom at an angle, a spring pressed plunger carried by said supporting means and engaged with said last mentioned lever, whereby when said plunger is depressed said last mentioned lever will swing the arm, thus drawing upon said rods whereby the rods will swing said levers to cause said links to lift said detents from said recessed members, thus releasing the bucket and allowing the same to swing due to its eccentric support.

2. In a device of the character described, the combination of a bail, means for movably supporting said bail, a bucket eccentrically mounted upon said bail and having recessed members at its ends, detents carried by said bail and normally fitting within said recesses for normally holding said bucket in an upright position, links connected to said detent, levers pivotally mounted upon said bail and being connected to said links, and means for swinging the upper ends of said levers toward each other, thereby causing said links to lift said detent from said recess members, thus releasing the bucket and allowing the same to swing due to its eccentric support.

3. In a device of the character described, the combination of a bail, means for movably supporting said bail, a bucket eccentrically mounted upon said bail and having a recessed member at its ends, detents carried by said bail and normally fitting within said recesses for normally holding said bucket in an upright position, links connected to said detent, levers pivotally mounted upon said bail and being connected to said links, rods carried by said supporting means and having bent ends engaging said levers, means for drawing said rods toward each other at the predetermined time, whereby the rods will swing said levers to cause said links to lift said detents from said recess members, thus releasing the bucket and allowing the same to swing due to its eccentric support.

4. In a device of the character described, the combination of a bail, means for movably supporting said bail, a bucket eccentrically mounted upon said bail and having recessed members at its ends, detents carried by said bail and normally fitting within said recesses for normally holding said bucket in an upright position, links connected to said detents, levers pivotally mounted upon said bail and being connected to said links, rods carried by said supporting means and having bent ends engaging said levers, an arm connected to the inner ends of said rods and having a lever extending therefrom at an angle whereby said last mentioned lever may be struck to swing the arm, thus causing the arm to draw upon said rods, whereby the rods will swing said first mentioned levers to cause said links to lift said detents from said recessed members, thus releasing the bucket and allowing the same to swing due to its eccentric support.

5. In a device of the character described, the combination of a bail, means for movably supporting said bail, a bucket eccentrically mounted upon said bail and having recessed members at its ends, detents carried by said bail and normally fitting within said recesses for normally holding said bucket in an upright position, means connected to said detents, levers pivotally mounted upon said bail and being connected to said links, an arm, means connecting said arm to said levers, said arm having a lever extending therefrom at an angle, a spring pressed plunger carried by said supporting means and engageable with said last mentioned lever, whereby when said plunger is depressed the last mentioned lever will swing the arm, thus causing said means to draw upon said levers, thus causing the levers to move the links and lift said detents and said recessed members, thus releasing the bucket and allowing the same to swing to its eccentric support.

In testimony whereof I affix my signature in presence of two witnesses.

OTTO F. WALLMAN.

Witnesses:
ALBERT SPINDLER,
M. MORTENSON.

Copies of this patent may be obtained for five cents each, by addressing the "Commissioner of Patents, Washington, D. C."